US010021558B2

(12) United States Patent
Lalwaney

(10) Patent No.: US 10,021,558 B2
(45) Date of Patent: Jul. 10, 2018

(54) SYSTEM AND METHODS FOR USING EMBEDDED SUBSCRIBER IDENTITY MODULE (ESIM) PROVISIONING PROCESSES TO PROVIDE AND ACTIVATE DEVICE CONFIGURATION PACKAGES ON A WIRELESS COMMUNICATION DEVICE

(71) Applicant: QUALCOMM Incorporated, San Diego, CA (US)

(72) Inventor: Poornima Lalwaney, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/084,057

(22) Filed: Mar. 29, 2016

(65) Prior Publication Data

US 2017/0289788 A1 Oct. 5, 2017

(51) Int. Cl.
| | | |
|---|---|---|
| *G06F 15/16* | (2006.01) | |
| *H04W 8/18* | (2009.01) | |
| *H04L 12/24* | (2006.01) | |
| *H04L 29/08* | (2006.01) | |
| *H04W 8/24* | (2009.01) | |

(52) U.S. Cl.
CPC ........... *H04W 8/18* (2013.01); *H04L 41/0803* (2013.01); *H04L 67/34* (2013.01); *H04W 8/24* (2013.01)

(58) Field of Classification Search
None
See application file for complete search history.

(56) References Cited

U.S. PATENT DOCUMENTS

| 9,843,585 | B2 * | 12/2017 | Haggerty | ............ H04L 63/0823 |
| 2010/0248690 | A1 | 9/2010 | Biggs et al. | |
| 2011/0306318 | A1 | 12/2011 | Rodgers et al. | |
| 2012/0108205 | A1 * | 5/2012 | Schell | ................. H04L 63/0823 |
| | | | | 455/411 |

(Continued)

FOREIGN PATENT DOCUMENTS

| EP | 2448216 A1 | 5/2012 |
| WO | 2016014184 A1 | 1/2016 |

OTHER PUBLICATIONS

International Search Report and Written Opinion—PCT/US2017/024282—ISA/EPO—dated Jun. 6, 2017.

*Primary Examiner* — Brian P Whipple
(74) *Attorney, Agent, or Firm* — The Marbury Law Group, PLLC

(57) ABSTRACT

Methods and devices are disclosed for customizing a wireless communication device having at least one radio frequency (RF) resource associated with an embedded subscriber identity module (eSIM). The wireless communication device may detect a condition that uses provisioning of a new subscriber identity module (SIM) profile for the eSIM, switch an enabled SIM profile for the new SIM profile, and identify one or more parameters based on information from the eSIM. Based on the identified one or more parameters, the wireless communication device may select a configuration package that provides configuration settings and software associated with at least one device feature, and corresponding activation commands. The wireless communication device may install and activate the configuration settings and software associated with the at least one device feature.

28 Claims, 10 Drawing Sheets

(56) References Cited

U.S. PATENT DOCUMENTS

| | | | |
|---|---|---|---|
| 2012/0115441 A1* | 5/2012 | Schell | H04L 63/0853 455/411 |
| 2012/0117635 A1* | 5/2012 | Schell | G06F 21/34 726/9 |
| 2013/0227646 A1* | 8/2013 | Haggerty | H04L 63/0853 726/3 |
| 2015/0017950 A1 | 1/2015 | Zhao et al. | |
| 2015/0215773 A1 | 7/2015 | Bai et al. | |
| 2015/0304506 A1 | 10/2015 | Zhu et al. | |
| 2016/0007190 A1 | 1/2016 | Wane | |
| 2016/0345162 A1* | 11/2016 | Li | H04B 1/3816 |
| 2017/0104750 A1* | 4/2017 | Li | H04L 63/0853 |

* cited by examiner

SYSTEM AND METHODS FOR USING EMBEDDED SUBSCRIBER IDENTITY MODULE (ESIM) PROVISIONING PROCESSES TO PROVIDE AND ACTIVATE DEVICE CONFIGURATION PACKAGES ON A WIRELESS COMMUNICATION DEVICE

BACKGROUND

Wireless communication devices that have flexibility in SIM configurations (e.g., multi-subscriber identity module (SIM)) devices have become increasing popular because of their capabilities in service options and other features for wireless communications. Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. Fourth generation (4G) mobile phone technology standards as defined by 3GPP and the International Telecommunication Union (ITU) support various systems, including Long Term Evolution (LTE), Time-division LTE (TD-LTE), LTE-Advanced, and Mobile Worldwide Interoperability for Microwave Access (WiMAX). Fifth generation (5G) mobile phone technology standards as defined by 3GPP and the Next Generation Mobile Networks (NGMN) Alliance will support various systems and a unified air interface across a broad wireless spectrum using, for example, millimeter wave technology and new spectrum.

In order to store the provisioning data that allows wireless communication devices to communicate with a wireless communications network, wireless communication devices may utilize a subscriber identity module (SIM) provided on a smart card such as a universal integrated circuit card (UICC). Traditionally, the SIM performs an Authentication and Key Agreement (AKA) procedure, which verifies and decrypts the applicable data and programs to ensure secure initialization.

During travel, users may obtain and install local SIM cards in their mobile communication devices in order to pay local call rates in the destination country. By using multiple SIMs, a user may take advantage of different service pricing plans and save on mobile data usage. However, users may be limited by the number of UICCs supported by the multi-SIM mobile communication device (e.g., a dual-SIM device supports two UICCs). Further, users may be inconvenienced by having to use different telephone numbers (e.g., mobile station international subscriber directory numbers (MSISDNs)) for different local services, as well as by the barriers to accessing personal data (e.g., a contacts list that is normally stored on a SIM) across multiple SIMs.

To overcome the costs and challenges of utilizing physical SIMs in a roaming environment, and to enable new services and subscription models as—technologies migrate to 4G and 5G, a wireless communication device may be configured with one or more embedded SIM (eSIM) that enables remote provisioning of SIM profiles. Specifically, remote provisioning may provide a typical SIM profile, including data, authentication algorithms, cryptographic keys, and other information that makes up a subscription. The eSIM thereby enables access to a wireless communication network.

SUMMARY

Systems, methods, and devices of various examples may enable customization of a wireless communication device having at least one radio frequency (RF) resource associated with an embedded subscriber identity module (eSIM) by detecting a condition that uses provisioning of a new subscriber identity module (SIM) profile for the eSIM, switching an enabled SIM profile for the new SIM profile, identifying one or more parameters based on information from the eSIM, selecting a configuration package based on the identified one or more parameters, and installing and activating the configuration settings and software associated with the at least one device feature. In some examples, the configuration package may provide configuration settings and software associated with at least one device feature and corresponding activation commands.

Some examples may further include determining whether the new SIM profile is available on the wireless communication device, sending a request to obtain the new SIM profile from a remote server managed by a network operator, and downloading and installing the new SIM profile received from the remote server. In some examples, switching the enabled SIM profile for the new SIM profile may include automatically receiving and installing the new SIM profile from a network server in response to the condition. In some examples, identifying one or more parameters and selecting the configuration package may be performed by the network server. In some examples, the configuration package may be automatically received from the network server together with the new SIM profile.

In some examples, the new SIM profile received from the network server may include corresponding installation and activation instructions. In some examples, the one or more parameters may include at least one of a country code, a network code, a group identifier, a radio access technology capacity, or an activated service. In some examples, the one or more parameters may include at least one of a predefined region, a selected service provider, or a particular communication service.

In some example, the one or more parameters may be further based on the at least one device feature, and the at least one device feature may include a hardware, modem or firmware element provided on the wireless communication device. In some examples, the one or more parameters may include at least one of a chipset model, operating system information, or a radio access technology capability.

Some examples may further include determining whether the selected configuration package is available on the wireless communication device, sending a request for the selected configuration package to a network entity in response to determining that the selected configuration package is not available on the wireless communication device; and determining whether the configuration settings of the selected configuration package are installed in response to determining that the selected configuration package is available on the wireless communication device. In some examples, the network entity may be the remote server managed by the network operator. In some examples, the remote server may be a Subscription Manager configured according to Remote SIM Provisioning (RSP) Architecture standards. In some examples, the selected configuration package may include at least one of hardware configurations and application settings.

Various examples include a wireless communication device configured to use at least one eSIM associated with an RF resource, and including a processor configured with processor-executable instructions to perform operations of the methods summarized above. Various examples also include a non-transitory processor-readable medium on which is stored processor-executable instructions configured to cause a processor of a wireless communication device to perform operations of the methods summarized above. Various examples include a wireless communication device having means for performing functions of the methods summarized above.

BRIEF DESCRIPTION OF THE DRAWINGS

The accompanying drawings, which are incorporated herein and constitute part of this specification, illustrate exemplary examples, and together with the descriptions of various examples, serve to explain the features herein.

DETAILED DESCRIPTION

Figure 1A:
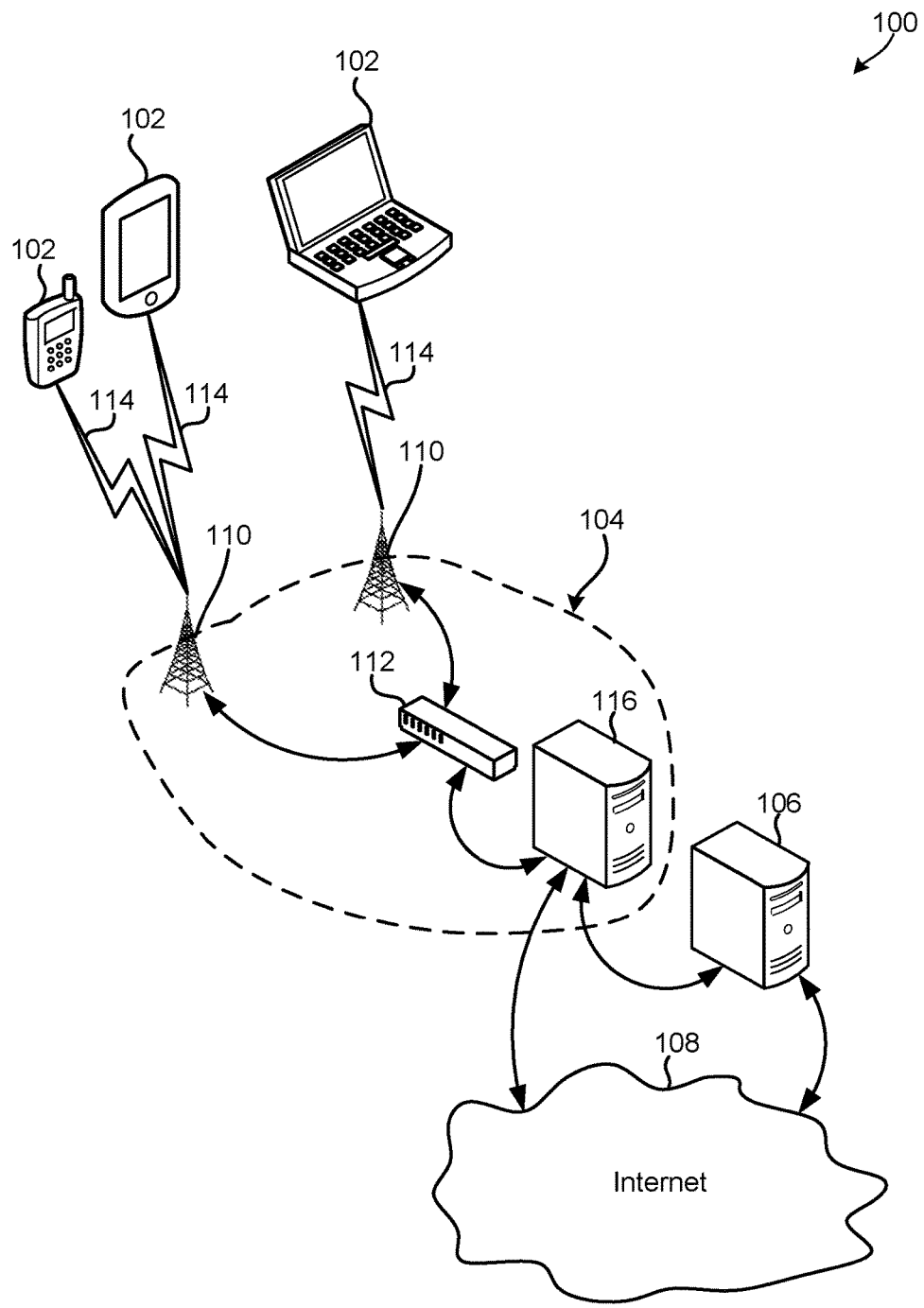
FIG. 1A is a communication system block diagram of a network suitable for use with various examples.

The various examples will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various examples provide methods and devices for improving customization of a wireless communication device by efficiently utilizing existing embedded SIM (eSIM) remote provisioning. Specifically, various examples provide methods of implementing device configuration packages in a wireless communication device configured with at least one eUICC. In some examples, eSIM remote provisioning processes may be extended to facilitate customization of the wireless communication device that can be performed dynamically and without additional hardware or memory requirements. In various examples, a remote server that stores eSIM provisioning information (e.g., the subscription manager) may also store, or have access to, configuration packages for the wireless communication device. The configuration packages may include configuration settings that modify/customize various device features, as well as activation commands.

The terms "wireless device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless connected health meters, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," and "subscriber identity module" are used interchangeably to refer to a memory that may be an integrated circuit such as an UICC or embedded into a removable card, and that stores an International Mobile Subscriber Identity (IMSI), related key, and/or other information used to identify and/or authenticate a multi-standby communication device on a network and enable a communication service with the network. Examples of SIMs include the Universal Subscriber Identity Module (USIM) provided for in the LTE 3GPP standard, and the Removable User Identity Module (R-UIM) provided for in the 3GPP2 standard. Universal Integrated Circuit Card (UICC) is another term for SIM. The terms "embedded UICC" and "eUICC" may refer to a non-removable UICC with a remote provisioning functionality.

The term "eSIM" may refer to a SIM profile that is remotely provisioned onto an eUICC. The terms "eSIM" and "eUICC" may be used interchangeably herein.

The terms subscription, SIM, and eSIM may also be used as shorthand reference to a communication network associated with a particular SIM, since the information stored in a MI enables the wireless device to establish a communication link with a particular network, thus the SIM and the communication network, as well as the services and subscriptions supported by that network, correlate to one another.

The terms "configuration package" and "device configuration package" are used interchangeably herein to refer to configuration routines, settings, and/or software that is needed to reconfigure a wireless communication device such that the device is capable of high level performance based on the eSIM data.

The term "server" is used herein to refer to any of a variety of commercially available computer systems configured to operate in a client-server architecture. In particular, the term "server" refers to network servers, particularly Internet or Intranet accessible servers, which typically include a processor, memory (e.g., hard disk memory), and network interface circuitry configured to connect the server processor to the network, such as the Internet or a cellular telephone network.

Device configurations for wireless communication devices may differ between geographic regions, service providers, and device features. For example, each region or provider may have different radio frequency channels, modem configurations, application configurations, drivers, etc. To accommodate these differences within a global market, original equipment manufacturers (OEMs) develop different device configuration packages with variations in the hardware, software, and settings. Modem images and modem configurations may correspond to operator network configurations and network services.

Configuration settings and parameters for various communication devices may also differ significantly from one geographic region to another and from one service provider to another. OEMs typically develop and manufacture hardware and software variants to accommodate differences of wireless communication device configuration practices and standards in deploying devices in multiple regions and/or for multiple service providers (e.g., for a global launch of the wireless communication device). For example, each region or service provider may have different radio frequency (RF) bands and modem standards, application/software configuration standards, hardware drivers, etc. Therefore, OEMs traditionally spend a considerable amount of time and resources in designing, implementing, and manufacturing hardware and software variants.

Current wireless communication devices may be capable of storing or accessing multiple configuration packages, one of which is selected and installed in an automatic configuration process. For example, use of a SIM may trigger selection and installation of a configuration packages based on parameters derived from the SIM.

In some wireless networks, a wireless communication device may have multiple subscriptions to one or more networks (e.g., by employing multiple subscriber identity module (SIM) cards or otherwise). For example, a first subscription may be a first technology standard, such as Wideband Code Division Multiple Access (WCDMA), while a second subscription may support the same technology standard or a second technology standard, such as Global System for Mobile Communications (GSM) Enhanced Data rates for GSM Evolution (EDGE) (also referred to as GERAN).

When SIM software is hard-coded to the physical SIM card media (e.g., UICC), subscribers purchase new SIM cards to change SIM operations. In an effort to reduce the inconvenience of swapping cards, some cards are preloaded with two SIMs (e.g., dual-SIM devices), enabling switching between operators. Such solutions have the user obtain a new SIM card to add any additional SIMs or replace SIMs.

Removable SIM cards are often inaccessible within small wireless communication devices, making it difficult to change the SIM once deployed. Therefore, currently wireless communication devices are increasingly being designed with a eUICC instead of a removable UICC.

A wireless communication device configured with a eUICC may connect with a remote server using an initial provisioning profile to request access to a network. The remote server, which may be a subscription manager or other network entity, provides a SIM profile to the mobile communication device. The SIM profile may be derived from information provided to the remote server by a mobile network operator (MNO), and may be stored on the remote server. The SIM profile may be downloaded by the wireless communication device, and saved in a eUICC. The wireless communication device may subsequently enable the SIM profile to enable communication on a wireless network (e.g., a mobile network operator (MNO)). In various examples, the remote server may authenticate the wireless communication device, confirming that the device is authorized to connect to the network operator, by any of a variety of existing authentication processes.

For clarity, while the techniques and examples described herein relate to a wireless device configured with at least one WCDMA/UMTS SIM and/or GSM SIM, the example techniques may be extended to subscriptions on other radio access networks (e.g., 1×RTT/CDMA2000, EVDO, LTE, WiMAX, Wi-Fi, etc.). In that regard, the messages, physical and transport channels, radio control states, etc. referred to herein may also be known by other terms in various radio access technologies and standards. Further, the messages, channels and control states may be associated with different timing in other radio access technologies and standards.

In various examples, an RF resource of a wireless communication device that is configured with a first eSIM and at least one of a second eSIM or first removable SIM, may be configured to be shared between a plurality of SIMs. The RF resource may be employed by default to perform communications on a network enabled by a first SIM, such as a network capable of high-speed data communications (e.g., WCDMA, HSDPA, LTE, etc.). As such, a modem stack associated with a second SIM of the device may often be in idle mode with respect to a second network. Depending on the radio access technology of the second network, such idle mode states may involve implementing a power saving mode that includes a cycle of sleep and awake states. For example, if the second network is a GSM network, while in the idle mode the modem stack associated with the second SIM may implement discontinuous reception (DRX).

Various examples may be implemented within a variety of communication systems, such as the example communication system 100 illustrated in FIG. 1A. The communication system 100 may include one or more wireless devices 102, a telephone network 104, and network servers 106 coupled to the telephone network 104 and to the Internet 108. In some examples, the network server 106 may be implemented as a server within the network infrastructure of the telephone network 104.

A typical wireless communication network 104 includes a plurality of cell base stations 110 coupled to a network operations center 112, which operates to connect voice and data calls between the wireless devices 102 (e.g., tablets, laptops, cellular phones, etc.) and other network destinations, such as via telephone land lines (e.g., a plain old telephone system (POTS) network, not shown) and the Internet 108. In some examples, the wireless devices 102 may include, for example, tablets, laptops, cellular phones, smartphones, desktop computers, etc. In some examples, the wireless devices 102 may include various smart objects that may not have physical SIM slots, for example, televisions, set top boxes, MP3 players, cameras, gaming consoles, e-readers, glasses, wrist watches, health monitoring devices, cars, meters (e.g. electricity, gas, or water consumption), jewelry, bank cards, sports equipment, cars, home appliances, and any other device that is capable of sending and receiving data to remote or removable devices. In various examples, the wireless devices 102 may be connected to one another and/or to other devices, forming a network in the "Internet of Things" (IoT).

The telephone network 104 may also include one or more servers 116 coupled to or within the network operations center 112 that provide a connection to the Internet 108 and/or to the network servers 106. Communications between the wireless devices 102 and the telephone network 104 may be accomplished via two-way wireless communication links 114, such as GSM, UMTS, EDGE, 4G, 3G, CDMA, TDMA, LTE, and/or other communication technologies.

Figure 1B:
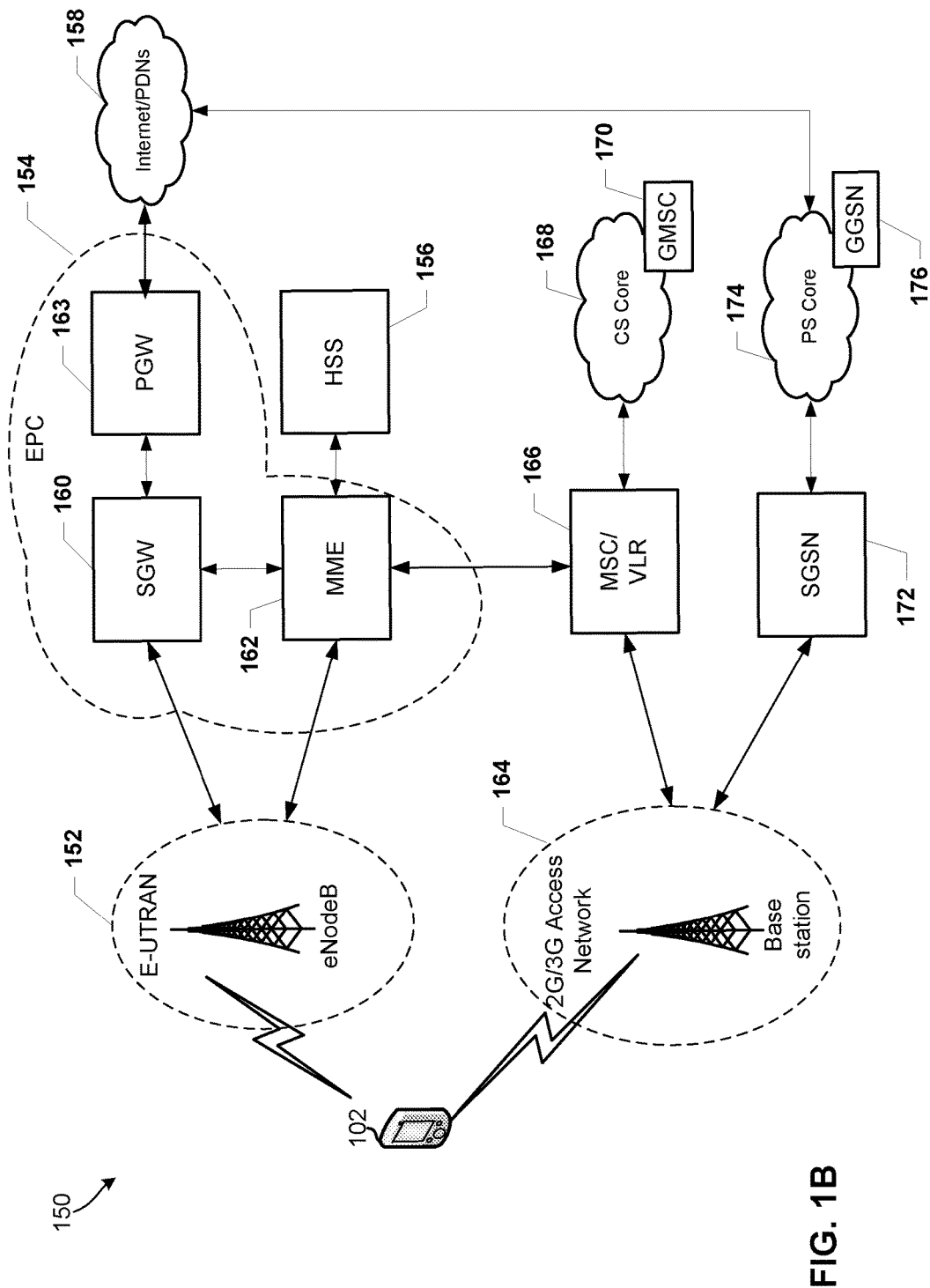
FIG. 1B is a block diagram of a network architecture suitable for use with the various examples.

FIG. 1B illustrates a network architecture 150 that includes multiple core networks for packet-switched communications. With reference to FIGS. 1A and 1B, in the network architecture 150 the wireless communication device 102 may connect to an LTE access network, for example, an Evolved UMTS Terrestrial Radio Access Network (E-UTRAN) 152. In the various examples, the E-UTRAN 152 may be a network of LTE base stations (i.e., eNodeBs) (e.g., 110 in FIG. 1A), which may be connected to one another via an X2 interface (e.g., backhaul) (not shown).

In various examples, each eNodeB in the E-UTRAN 152 may provide an access point to an LTE core network. In various examples, the evolved packet core (EPC) 154 may include at least one Mobility Management Entity (MME) 162, a Serving Gateway (SGW) 160, and a Packet Data Network (PDN) Gateway (PGW) 163.

In various examples, the E-UTRAN 152 may connect to the EPC 154 by connecting to the SGW 160 and to the MME 162 within the EPC 154. The MME 162, which may also be logically connected to SGW 160, may handle tracking and paging of the wireless communication device 102 and security for E-UTRAN access on the EPC 154. The MME 162 may be linked to a Home Subscriber Server (HSS) 156, which may support a database containing user subscription, profile, and authentication information. Further, the MME 162 ma provide bearer and connection management for user Internet protocol (IP) packets, which are transferred through the SGW 160.

The SGW 160 may route incoming and outgoing IP packets for the wireless device 102 via the LTE access network and external IP networks (i.e., packet data networks (PDNs)). The SGW 160 may also provide an anchor point for handovers between eNodeBs. The SGW 160 may be logically connected to a PDN Gateway (PGW) 163, which may route packets to and from PDNs to form a connection between the EPC and various PDNs. The PGW 163 may be logically connected to a Policy Charging and Rules Function (PCRF), a software component that may enforce minimum quality of service parameters, and manage and control data sessions. The PGW 163 may also provide connections with other public or private networks (e.g., the Internet, an Intranet, an IP Multimedia Subsystem (IMS), a PS Streaming Service (PSS), etc.).

The network architecture 150 may include circuit-switched networks and additional packet-switched (PS) networks. In some examples, the wireless communication device 102 may be connected to the CS and/or PS packet switched networks by connecting to a legacy second generation (2G)/third generation (3G) access network 164. In some examples, the 2G/3G access network 164 may be, for example, one or more UTRAN, GSM Enhanced Data rates for Global Evolution (EDGE) Radio Access Network (GERAN), CDMA2000 1×RTT, CDMA2000 1×EV-DO, etc. In the various examples, the 2G/3G access network 164 may include a network of base stations (e.g., base transceiver stations (BTSs), nodeBs, radio base stations (RBSs), etc.) (e.g., 110), as well as at least one base station controller (BSC) or radio network controller (RNC). In various examples, the 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

In various examples, the 2G/3G access network 164 may connect to the PS network via an interface with (or gateway to) a Serving GPRS support node (SGSN) 172, which may connect to a PS core 174. In the PS network, the PS core 174 may be connected to external PS networks (i.e., various PDNs 158) through a Gateway GPRS support node (GGSN) 176.

Figure 2:
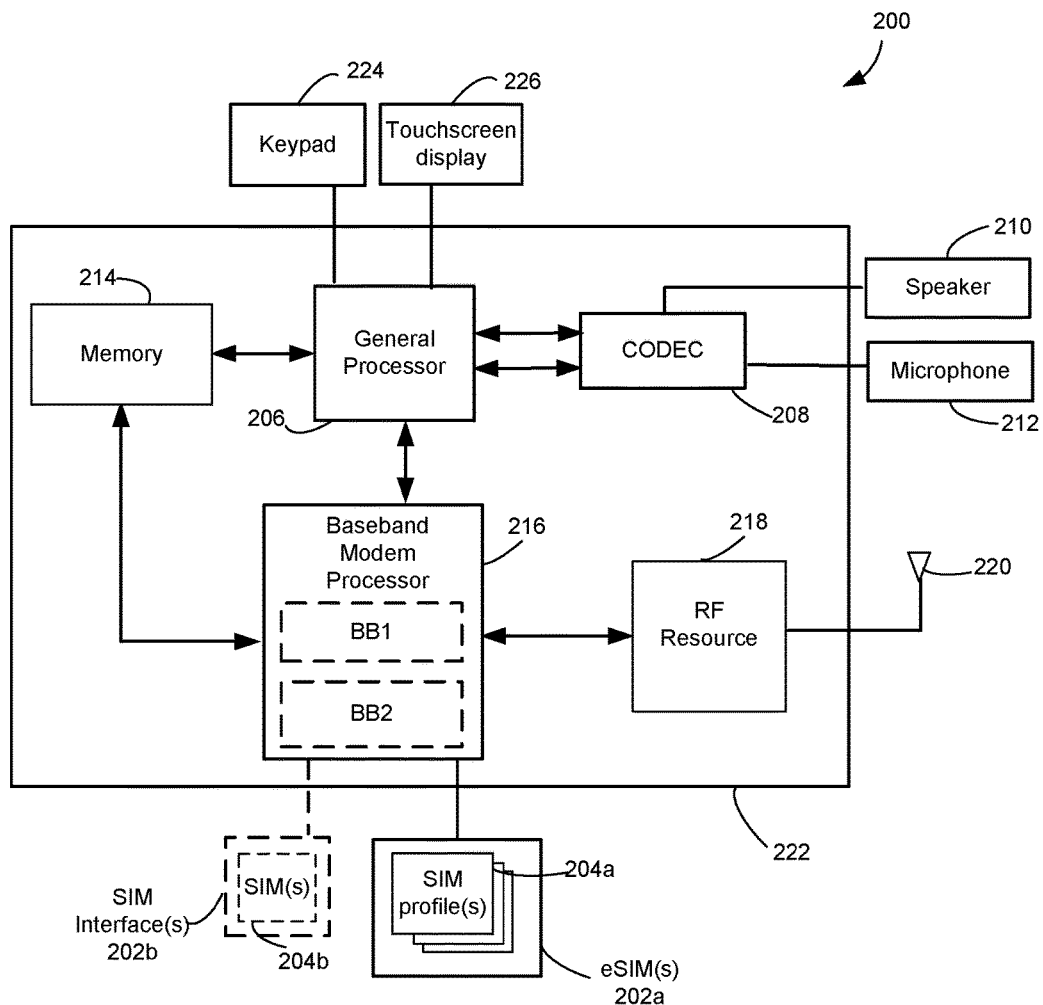
FIG. 2 is a block diagram illustrating components of a wireless communication device suitable for use with various examples.

FIG. 2 is a functional block diagram of an example wireless communication device 200 that is suitable for implementing various examples. The wireless device 200 may be similar to one or more of the wireless devices 102 described with reference to FIGS. 1A and 1B. The wireless device 200 may include at least one eSIM 202a, which may be a eUICC configured with SIM profile(s) 204a. In various examples, the eSIM 202a may represent a plurality of UICCs provisioned with SIM profiles in the device. Also, the SIM profile(s) 204a may represent any of a plurality of SIM profiles that can be saved on the eUICC(s). Optionally, the wireless device 200 may also include one or more conventional SIM interface 202b, which may receive a removable SIM 204b associated with a second subscription. The removable SIM in may be a Universal Integrated Circuit Card (UICC) that is configured with a SIM and/or USIM applications, enabling access to GSM and/or UMTS networks. The UICC may also provide storage for a phone book and other applications.

Each eSIM 202a may have a CPU, ROM, RAM, EEPROM and I/O circuits. The SIM profile(s) 204a used in various examples may contain user account information, an IMSI a set of SIM application toolkit (SAT) commands and storage space for phone book contacts. The SIM profile(s) 204a may further store home identifiers (e.g., a System Identification Number (SID)/Network Identification Number (NID) pair, a Home PLMN (HPLMN) code, etc.) to indicate the SIM network operator provider. Each SIM profile 204a may be associated with an Integrated Circuit Card Identity (ICCID) for identification.

The wireless device 200 may include at least one controller, such as a processor 206, which may be coupled to a coder/decoder (CODEC) 208. The CODEC 208 may in turn be coupled to a speaker 210 and a microphone 212. The processor 206 may also be coupled to at least one memory 214. The memory 214 may be a non-transitory tangible computer readable storage medium that stores processor-executable instructions. For example, the instructions may include routing communication data relating to a subscription though a corresponding baseband-RF resource chain. The memory 214 may store operating system (OS), as well as user application software and executable instructions.

In various examples, a configuration storage area may be included, for example, as a hidden partition or secure storage within the memory 214, or the entire eUICC/eSIM provisioning may be in a secure subsystem that includes a dedicated secure processor and secure memory. In some examples, the user may be restricted from accessing information stored in the configuration storage area. The processor 206 may access information (e.g., the configuration routines and/or base software) in the hidden partition and configure the wireless communication device based on the configuration routines. In some examples, at least a portion of the configuration storage area may be in a memory device external to the wireless communication device, and that is physically (or wirelessly) connectable to the wireless communication device for transferring data (e.g., a dongle or other universal serial bus (USB) memory devices, an external secure digital (SD) card, and/or other external memory devices connectable to the wireless communication device 200).

The processor 206 and memory 214 may each be coupled to at least one baseband-modem processor 216. Each eSIM 202a and, if included, removable SIM 204b may be associated with a baseband-RF resource chain that includes at least one baseband-modem processor 216 and at least one RF resource 218. Alternatively, all of the eSIMs 202a and removable SIMs 204b may share a single baseband-RF resource chain that includes the baseband-modem processor 216 and RF resource 218. In some examples, the shared baseband-RF resource chain may include, for each eSIM 204a and, optionally, removable SIM 204b, separate baseband-modem processor 216 functionality (e.g., BB1 and BB2). The RF resource 218 may be coupled to at least one antenna 220, and may perform transmit/receive functions for the wireless services associated with each SIM profile 204a of the wireless device 200. The RF resource 218 may implement separate transmit and receive functionalities, or may include a transceiver that combines transmitter and receiver functions.

In particular examples, the processor 206, memory 214, baseband-modem processor 216, and RF resource 218 may be included in a system-on-chip device 222. The SIM profile(s) 204a and corresponding eSIM(s) 204a, and optional removable SIM(s) 204b and corresponding SIM interface(s) 202b, may be external to the system-on-chip device 222. Further, various input and output devices may be coupled to components of the system-on-chip device 222, such as interfaces or controllers. Example user input components suitable for use in the wireless device 200 may include, but are not limited to, a keypad 224 and a touchscreen display 226.

In some examples, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive selection of a contact from a contact list or to receive a telephone number. As another example, the request to initiate the outgoing call may be in the form of a voice command received via the microphone 212. Interfaces may be provided between the various software modules and functions in the wireless device 200 to enable communication between them, as is known in the art.

In various examples, a wireless communication device may be customized by various configuration settings, which may include region-specific (e.g., area-specific and/or country-specific) configurations, service provider-specific configurations, and/or other suitable configurations, or combinations thereof. Each type of configuration setting may configure one or more attributes of the wireless communication device (e.g., by defining the hardware functions, software behavior, etc.). The particular configuration settings that may apply to the wireless communication device based on one or more parameters, such as a specific location, service provider, chipset, etc., may be grouped into a "configuration package." In various examples, configuration packages may include configuration and/or customizations for a wireless communication device, including various settings, software, and/or configuration routines. Such configuration packages in some examples may be established by entities in the manufacturing chain, entities in the distribution chain, and/or the user. For example, if a device manufacturer produces global hardware, the provisioning server protocols may include a hardware detection step to initiate the correct hardware block corresponding to the device capabilities and country (e.g., RF band configurations).

In various examples, configuration packages may be stored on a remote server, and downloaded or otherwise copied to the wireless communication device 200 through a network when triggered by the set of conditions. The network identification and SIM-related service identifiers that currently reside on physical SIMs may be downloaded and provisioned to the new eSIMs over the air using standards defined protocols. The example methods and apparatus extend the protocols for eSIM provisioning to include multi-bearer network (MBN) and Operator packages (features and applications) to be downloaded on an unprovisioned device. In addition, the eSIM, modem, network and application settings, modem and applications feature control and/or carrier images will be provisioned and applied.

In some examples, configuration settings may be stored on a remote server, enabling configuration packages to be dynamically assembled based on new sets of conditions. Once assembled, the configuration packages may also be stored on the remote server, and downloaded/copied to the wireless communication device. In some examples, predetermined configuration packages may be stored in a storage location on the wireless communication device for subsequent activation. In some examples, configuration packages may be dynamically assembled using the stored configuration settings. In some wireless devices, at least a portion of the configuration settings may be preloaded in the wireless communication device before the device is switched on for the first time. For example, at least a portion of the configuration settings may be stored by the OEM, retailers, service providers, etc. Configuration settings may include, for example, various hardware configurations, such as for a modem processor (e.g., the baseband processor 216), the RF resource 218, the processor 206, etc.

The configuration settings may include, for example, various application configurations, such as application initialization settings, internet settings (e.g., access point name, application database settings, browser settings, etc.), software versioning options, reboot settings, install location selection, messaging application settings, user-agent string and profile settings, contacts settings, AM/FM radio settings, music sharing settings, Bluetooth settings, USB settings, Wi-Fi settings, email settings, etc. The configuration settings may also include, for example, various network settings, such as cell broadcast settings, data roaming settings, network identity and time zone settings, emergency call settings, mobile data settings, network mode option settings, etc.), location positioning settings (e.g., wireless network position settings, global positioning system settings, assisted global positioning system settings, and/or the like).

The configuration settings may also include various device preference configurations, such as sound settings (ringtone settings, alarm tone settings, short message service tone settings, keypad tone settings, music settings, maximum sound settings, low battery tone, etc.) media settings (e.g., boot media settings, alarm media settings, notifications media settings, user interface media settings, wallpaper and screen settings, etc.), date and time settings (e.g., time zone settings, time and data format settings, and/or the like), language settings (e.g., default input method settings, additional input method settings, default system language settings, other system language settings, etc.), accessibility settings (e.g., auto rotation settings, TalkBack service settings, auto-correction settings, and/or the like), and developer options (e.g., USB debugging options, stay awake settings, fake position/mock location settings, and/or the like).

The configuration settings may also include various operating system/firmware configurations, such as shared library settings (e.g., shared libraries associated with one or more package file format), resource settings (e.g., framework resources, libraries, and/or the like), software settings in kernel/native layer for languages such as C and/or C++, various drivers for hardware components (e.g., camera drivers, user interface drivers, recording device drivers, framework drivers, and/or the like).

Configuration packages may include any of a number of configuration settings, and may be based on one or a plurality of conditions, each associated with a subset of the configuration settings. For example, country-specific configuration settings may include configurations for hardware and/or software (e.g., data frame settings, operator settings, drivers, etc.), national regulatory configurations (e.g. public land mobile network settings), media configurations, etc. Configuration settings relating to a service provider may include the device settings, the network settings, messaging application settings, the user-agent string and profile settings, the language settings, the application configurations, the location positioning configurations, the shared library settings, the resource settings, the software settings in kernel/native layer, the various drivers for hardware components, the Wi-Fi settings, the email settings, etc.

The country-specific configuration settings may be combined with the service-provider configuration settings, and presented together as a configuration package that customizes the wireless communication device.

In various examples, configuration packages may include activation commands corresponding to the configuration settings. The configuration packages may be stored in the configuration storage area, and classified or arranged to present a modular or hierarchical format. Arranging and storing configuration packages and/or configuration settings in modular format can reduce cost for the original equipment manufacturer (OEM) to provide software for accommodating all markets in which the wireless communication device 200 may be released, as well as reducing runtime and resources when the wireless communication device 200 locates specific configuration settings and/or packages. The configuration packages and/or settings may be classified based on the region and/or service providers.

In some examples, the wireless communication device 200 may be configured with base software that may be common to all (or most) wireless communication devices operating in an area, country, and/or the like using services provided by any service provider. The base software, when executed by a processor 206 of the wireless communication device 200, may configure the wireless communication device 200 to be able to perform basic functions, such as, but not limited to, powering on, displaying information (e.g., configuration routine selection) on the touchscreen display 226, accepting user input from keypad 224 and/or the touchscreen display 226, configuring various hardware components of the wireless communication device 200 for basic functions, and/or the like. In particular, additional basic functions may include: reading and processing information included in received SIMs, matching a set of configuration routines with each SIM, selecting one of the configuration routines, displaying configuration information on the touchscreen display 226, and configuring the wireless communication device. In other words, the base software may enable the configuration process to customize a wireless communication device. Accordingly, the base software may provide a default configuration that enables the device to perform basic functions before other features are configured.

In various examples, a configuration package may be used to modify the wireless communication device 200 in response to one or more triggering events. In some examples, the triggering event may occur during or at a build-time of the wireless communication device 200. In other examples, the triggering event may occur during runtime. In some examples, a configuration package may be installed and/or activated as directed by a configuration routine. Such routines may executed automatically (e.g., by the processor 206 of the wireless communication device 200 in response to triggers as described) and/or manually (e.g., by designated personnel from the OEM, etc.).

Figure 3A:
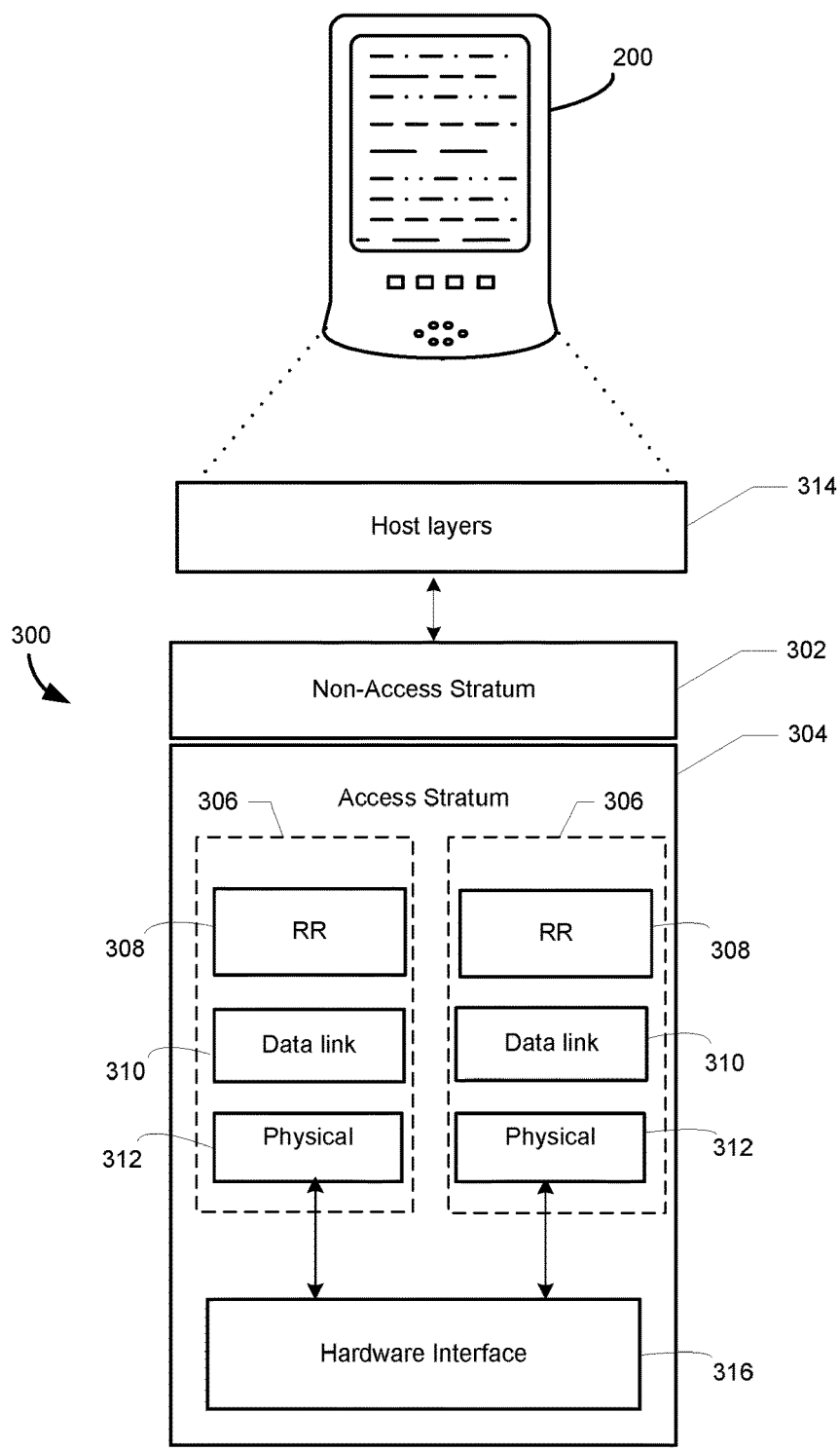
FIG. 3A is a system architecture diagram illustrating example protocol layer stacks implemented by the wireless communication device of FIG. 2.

FIG. 3A illustrates an example of software architecture with layered radio protocol stacks that may be used in data communications on a wireless communication device.

Referring to FIGS. 1-3A, wireless communication device 200 may have a layered software architecture 300 to communicate over access networks associated with SIMs. The software architecture 300 may be distributed among one or more processors, such as baseband-modem processor 206. The software architecture 300 may also include a Non Access Stratum (NAS) 302 and an Access Stratum (AS) 304. The NAS 302 may include functions and protocols to support traffic and signaling for each SIM of the wireless communication device 200 and their respective core networks. The AS 304 may include functions and protocols that support communication between each SIM (e.g., first SIM profile 204a, removable SIM 204b) and entities of their respective access networks (e.g., an MSC in a GSM network, an eNodeB in an LTE network, etc.).

In various examples, the AS 304 may include at least one protocol stack 306. In some examples, as shown in software architecture 300, the wireless communication device 200 may be a multi-SIM wireless communication device, with the AS 304 including multiple protocol stacks 306, each of which is associated with a different SIM. For example, in a dual-SIM device, the AS 304 may include two protocol stacks 306, which may be respectively associated with a first eSIM and either a second eSIM or first removable SIM. In some examples, the wireless communication device 200 may be a single-SIM device, and the AS 304 may include a single protocol stack 306 (not shown). Although described below with reference to GSM-type communication layers, protocol stack(s) 306 may support any of variety of standards and protocols for wireless communications.

In particular, the AS 304 may include at least three layers, each of which may contain various sublayers. For example, the protocol stack(s) 306 may include Radio Resource management (RR) sublayer(s) 308 as part of Layer 3 (L3) of the AS 304 in a GSM or LTE signaling protocol. The RR sublayer(s) 308 may oversee the establishment of a link between the wireless communication device 200 and associated access networks. In the various examples, the NAS 302 and RR sublayer(s) 308 may perform the various functions to search for wireless networks and to establish, maintain and terminate calls. Further, the RR sublayer(s) 308 may provide functions including broadcasting system information, paging, and establishing and releasing an Radio Resource Control (RRC) signaling connection between the wireless communication device 200 and the associated access network. While not shown, the software architecture 300 may include additional Layer 3 sublayers, as well as various upper layers above Layer 3.

Additional sub-layers may include, for example, connection management (CM) sub-layers (not shown) that route calls, select a service type, prioritize data, perform QoS functions, etc.

Residing below the Layer 3 sublayers (RR sublayer(s) 308), the protocol stack(s) 306 may also include data link layer(s) 310, which may be part of Layer 2 in a GSM or LTE signaling protocol. The data link layer(s) 310 may provide functions to handle incoming and outgoing data across the network, such as dividing output data into data frames and analyzing incoming data to ensure the data has been successfully received. In some examples, data link layer(s) 310 may contain various sublayers, such as a media access control (MAC) sublayer, a radio link control (RLC) sublayer, and a packet data convergence protocol (PDCP) sublayer, each of which form logical connections terminating at the access network. In various examples, a PDCP sublayer may provide uplink functions including multiplexing between different radio bearers and logical channels, sequence number addition, handover data handling, integrity protection, ciphering, and header compression. In the downlink, the PDCP sublayer may provide functions that include in-sequence delivery of data packets, duplicate data packet detection, integrity validation, deciphering, and header decompression.

In the uplink, the RLC sublayer may provide segmentation and concatenation of upper layer data packets, retransmission of lost data packets, and Automatic Repeat Request (ARQ). In the downlink, the RLC sublayer functions may include reordering of data packets to compensate for out-of-order reception, reassembly of upper layer data packets, and ARQ.

In the uplink, the MAC sublayer may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

Residing below the data link layer(s) 310, the protocol stack(s) 306 may also include physical layer(s) 312, which may establish connections over the air interface and manage network resources for the wireless communication device 200. In various examples, the physical layer(s) 312 may oversee functions that enable transmission and/or reception over the air interface. Examples of such physical layer functions may include cyclic redundancy check (CRC) attachment, coding blocks, scrambling and descrambling, modulation and demodulation, signal measurements, MIMO, etc.

While the protocol stack(s) 306 provide functions to transmit data through physical media, the software architecture 300 may further include at least one host layer 314 to provide data transfer services to various applications in the wireless communication device 200.

In some examples, application-specific functions provided by the at least one host layer 314 may provide an interface between the protocol stack(s) 306 and the general processor 206. In some examples, the protocol stack(s) 306 may include one or more higher logical layer (e.g., transport, session, presentation, application, etc.) that provides host layer functions. For example, in some examples, the software architecture 300 may include a network layer (e.g., IP layer) in which a logical connection terminates at a gateway (e.g., PGW 163). In some examples, the software architecture 300 may include an application layer in which a logical connection terminates at another device (e.g., end user device, server, etc.). In some examples, the software architecture 300 may further include in the AS 304 a hardware interface 316 between the physical layer(s) 312 and the communication hardware (e.g., one or more RF resource).

In various examples, the protocol stack(s) 306 of the layered software architecture may be implemented to allow modem operation using information provisioned on multiple SIMs. Therefore, a protocol stack that may be executed by a baseband-modem processor is interchangeably referred to herein as a modem stack.

The modem stacks in various examples may support any of a variety of current and/or future protocols for wireless communications. For examples, the modem stacks in various examples may support networks using radio access technologies described in 3GPP standards (e.g., GSM, UMTS, LTE, etc.), 3GPP2 standards (e.g., 1×RTT/CDMA2000, Evolved Data Optimized (EVDO), Ultra Mobile Broadband (UMB), etc.) and/or Institute of Electrical and Electronic Engineers (IEEE) standards Worldwide Interoperability for Microwave Access (WiMAX), Wi-Fi, etc.). The modem stacks in various examples may also support networks using 4G and/or 5G radio access technologies (e.g., LTE-Advanced, TD-LTE, Mobile WiMAX, etc.).

As described, standards developed for eSIM capable devices include operations for remote provisioning (e.g., the ability to remotely change the SIM profile on a deployed SIM). The eSIM provisioning allows for remotely (e.g., over-the-air (OTA)) enabling/disabling an operator profile thus enabling a change of active operator. Also, eSIM provisioning enables remotely deleting or updating an operator profile within a eUICC, and facilitates secure over the air management of mobile operator credentials within a SIM. The eSIM provisioning also provides the ability to remotely change the SIM profile without requiring the SIM to be physically removed or utilize a multi-SIM capability (e.g., dual-SIM) provided by the device. Remote provisioning may be implemented on both embedded SIMs and traditional removable SIMs.

Various example eUICCs may be configured with memory capable of storing multiple (e.g., up to four) SIM profiles simultaneously. For example, a user may purchase a SIM profile (i.e., a service package for communication and network activities) from a network operator, which may be downloaded and stored in the eUICC memory. If the user purchases a second SIM profile from another network operator, the new SIM profile is also downloaded and saved to the same eUICC. Therefore, the eSIM capability enables the wireless communication device to switch between the two installed profiles in a manner there is an ability to swap between the two installed profiles.

The eSIM remote provisioning may be performed as described in the standards, such as those put forth by the GSM Association (GSMA) (e.g., Official Document 12FAST.15 entitled "Remote Provisioning Architecture for Embedded UICC Technical Specification" Version 1.0 (Dec. 17, 2013), and Official Document SGP.22 entitled "Remote SIM Provisioning (RSP) Technical Specification" Version 1.0 (Jan. 13, 2016)).

In GSMA eSIM provisioning, a SIM profile may be a provisioning profile or an operational profile. The provisioning profile may be a communication profile initially stored in a eUICC by the device manufacturer or retailer. The provisioning profile is a limited-application communication profile that is used only to enable downloading and switching to operational profiles. The operational profile is a normal communication profile for connecting to wireless communication networks, but that is also capable of performing the role of the provisioning profile when obtaining a new operational profile.

Figure 3B:
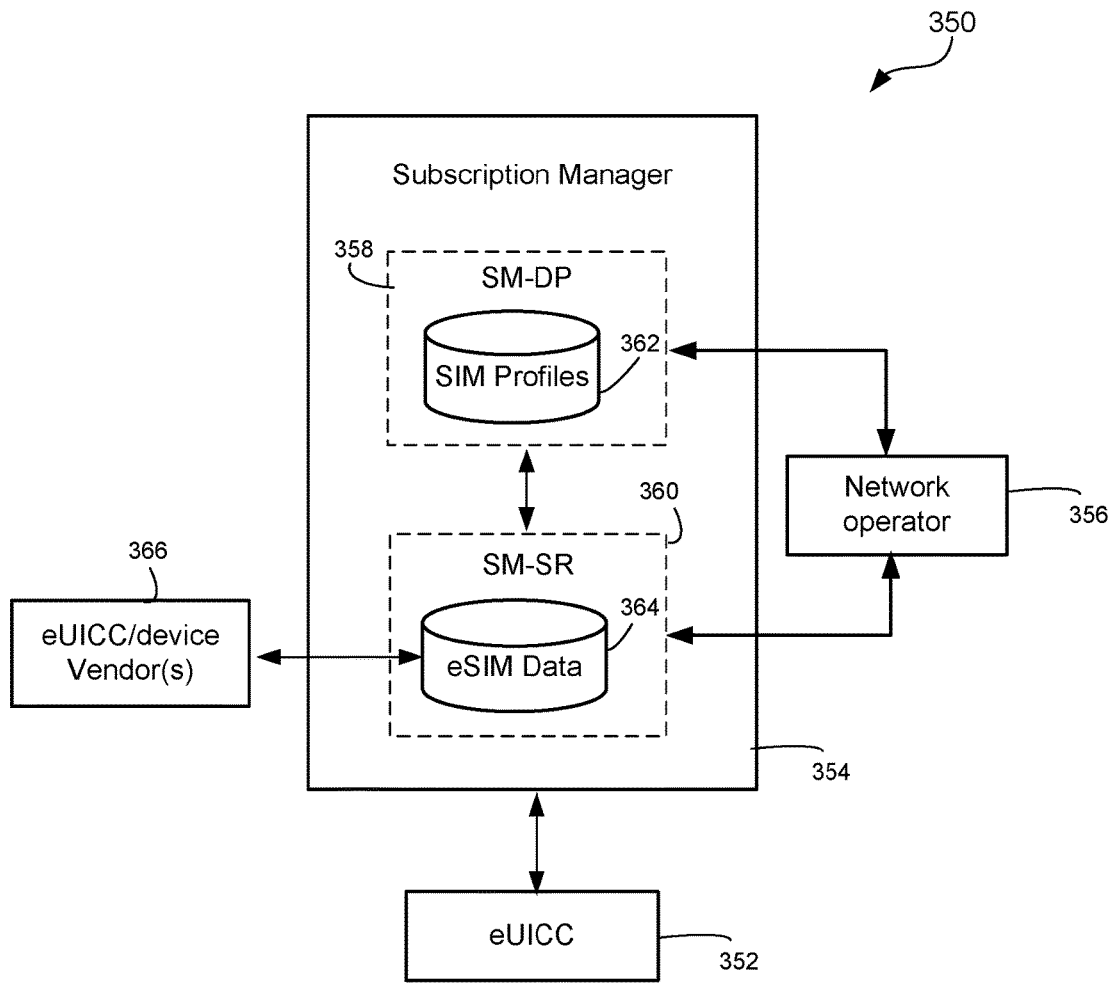
FIG. 3B is a system architecture diagram illustrating example entities involved in remote provisioning for a wireless communication device.

FIG. 3B illustrates a remote provisioning architecture 350 suitable for enabling and providing eSIM functionality in various examples. With reference to FIGS. 1-3B, a wireless communication device (e.g., 102, 200) may be configured with one or more eUICC 352 capable of storing multiple SIM profiles, including an enabled SIM profile. SIM profiles may be controlled over-the-air (OTA) by a Subscription Manager 354.

In various examples, the Subscription Manager 354 may be a remote server that is managed and maintained by one or more network operators 356, and which is responsible for executing policies of the one or more network operator 356. The Subscription Manager 354 may include logic to perform functions divided into two entities, a Subscription Manager Data Preparation (SM-DP) 358, and a Subscription Manager Secure Routing (SM-SR) 360. Such division of functions is provided in order to enhance security of SIM information. Specifically, since the information stored in SIM profiles is highly private, a secure environment is built by separating the creation of the SIM profiles (e.g., through the SM-DP) from the communications with the eUICC (e.g., through the SM-SR).

In various examples, the SM-DP 358 may securely create and store SIM profiles 362 to be provisioned on eSIM-capable devices. The SM-DP 358 may receive information used to create a SIM profile (e.g., MSISDNs, IMSI, etc.) from the one or more network operators 356. The SM-DP 358 may also manage credentials and profiles (e.g., at least one of IMSI, K, additional service applications, additional service data, etc.) associated with the network operator 356.

In various examples, the SM-SR 360 may establish secure communication with the eUICC 352 for transport of the SIM profile and various management commands in order to load, enable, disable, and delete SIM profiles on the eUICC 352. Specifically, the SM-SR 360 may have eSIM data 364 that includes a eUICC Information Set (EIS) for establishing such secure communication with the eUICC 352. The EIS has key information for accessing the eUICC (the Platform Management Credential), and state information such as whether each SIM profile is enabled or disabled.

The Platform Management Credential may enable the SM-SR 360 to access the eUICC 352 securely and to perform instructions to switch the enabled profile. In various examples, the SM-SR 360 may manage OTA communications with the eUICC 352 through a ciphered virtual private network (VPN). The SM-SR 360 may also manage eUICC data provided by a eUICC vendor for OTA communications provided by a eUICC supplier eSIM data 364 maintained on the SM-SR 360 may also utilize and store other data provided by a eUICC and/or device vendor 366. The functions of SM-SR 360 and SM-DP 358 may be provided by different entities or a single entity.

Examples described herein relate to improving device customizations (e.g., hardware configurations, application settings, etc.) techniques by integrating with the described eSIM remote provisioning processes.

In some examples, the wireless communication device may be customized based on an eSIM remote provisioning process. The SIM profiles in various examples may contain parameters that are optimized for, and/or operable for, a predefined region (e.g., country or other geographic area), service provider, service, or any combination thereof. The parameters and additional fields provided by the SIM may be used to trigger the configuration of the wireless communication device as described.

In various examples, OEMs may design, implement, and manufacture a single device (or device model) configuration with uniform hardware and software to roll out for use in multiple (some or all) regions, service providers and services. In other words, the OEM may enable multiple different customizations for a wireless communication device (or a model of wireless communication devices), where each different customization corresponds to a different respective hardware and/or software configuration that allows the wireless communication device to operate in or with one or more predefined regions, service providers and services. The multiple customizations may be operator market customizations or open market customizations. For example, the wireless communication device may be provided with capabilities for hardware customizations and corresponding software customizations to accommodate parameters for SIM profiles (e.g., network information) and/or other device features.

In various examples, a wireless communication device may attach to a network associated with a current SIM profile (i.e., first network). The current SIM profile may be a provisioning profile, or may be an enabled operational profile. The wireless communication device may connect to the first network and communicate with the Subscription Manager 354 in order to acquire a new SIM profile (i.e., a new operational profile). Once received, such new SIM profile may be enabled in the eUICC. For example, the wireless communication device may initiate a packet switched connection with the Subscription Manager 354 on the first network through a corresponding eSIM protocol stack. The packet switched connection may involve, on the network layer of the corresponding eSIM protocol stack, establishing a data structure. For example, for a UMTS network associated with the current SIM profile, the wireless communication device may activate a primary or secondary packet data protocol (PDP) context. In another example, for an LTE network associated with the current SIM profile, the wireless communication device may establish a default or dedicated evolved packet system (EPS) bearer. In various examples, such data structure may generally be referred to herein as a "data bearer," regardless of the particular network technology and/or communication protocol being used. In various examples, the established data bearer may provide the wireless communication device with access to a PDN access through a PGW (e.g., 163), a GGSN (e.g., 176), etc.

The Subscription Manager 354 may be at least one remote server accessible on the wireless communication network associated with the first SIM through the established PDP context or bearer. That is, the wireless communication device may use the established PDP context or bearer to send packets to and receive packets from the subscription management system. In some examples, the network entity 208 may belong to a Long Term Evolution (LTE) network (e.g., an eNodeB and/or a mobility management entity (MME)). In other examples, the network entity 208 may belong to a UTRAN network (e.g., a nodeB). As such, connecting to at least one network entity 208 may involve assignment of an IP bearer (e.g., a default or dedicated IP bearer) or a PDP context (e.g., a primary or secondary PDP context).

Figure 4A:
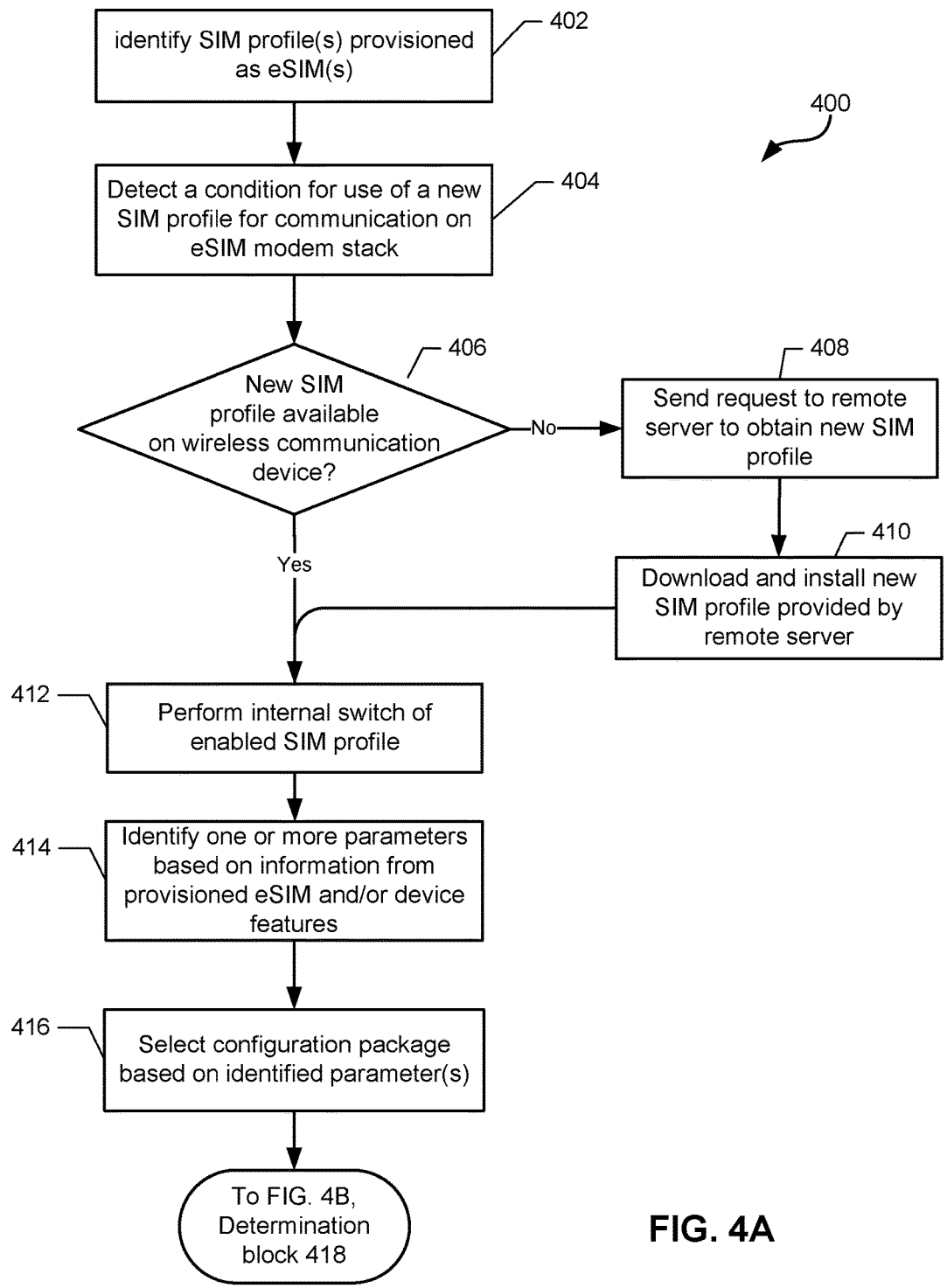
FIGS. 4A-4C are process flow diagrams illustrating methods for customizing a wireless communication device according to various examples.
Figure 4B:
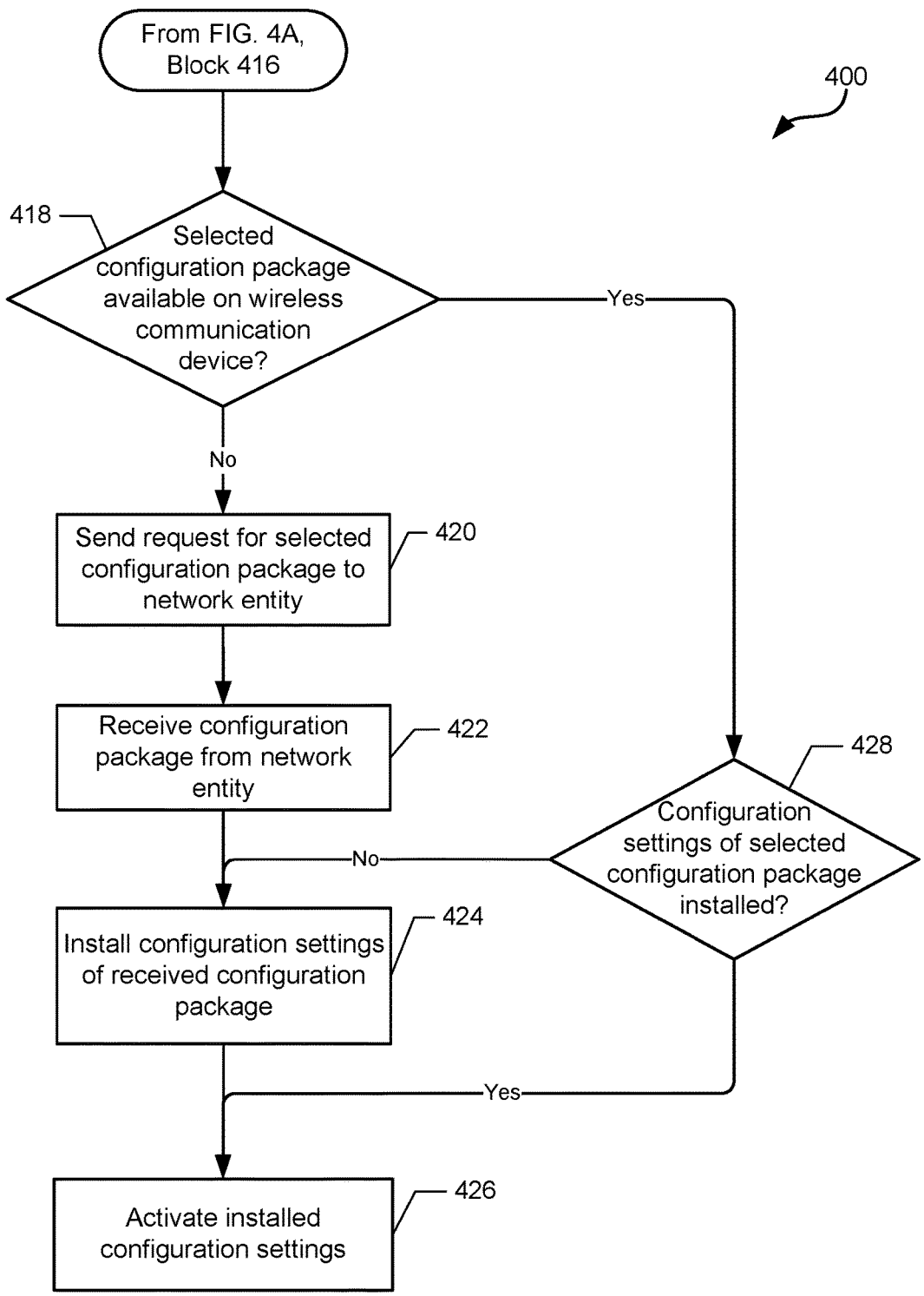

FIGS. 4A and 4B illustrates a method 400 for customizing configuration settings on a wireless communication device using eSIM remote provisioning. With reference to FIGS.

1A-4B, the wireless communication device (e.g., 102, 300) may be configured with at least one eSIM (e.g., 202*a*) supported by an RF resource (e.g., 218).

Although described below with reference to an eSIM implemented as a SIM profile in a eUICC, the method 400 may be applied to a variety of other device configurations, for example, multi-SIM devices configured with more than two eSIMs, and/or with at least one SIM stored on a removable UICC. In various examples, a removable UICC may store a conventional SIM, or may store software that enables remote provisioning, thereby effectively retrofitting the removable SIM with eSIM capabilities. In various examples, the operations of the method 400 may be implemented in the customization manager by one or more processors of the wireless communication device, such as a general-purpose processor (e.g., 206) and/or baseband-modem processor (e.g., 206). In some examples, the operations of the method 400 may be implemented by a separate controller (not shown) that may be coupled to memory (e.g., 214) and to the one or more processors.

In block 402, the wireless communication device processor may identify SIM profiles that are provisioned as eSIM (s) on the wireless communication device. That is, the wireless communication device processor may identify an enabled SIM profile for each eUICC of the wireless communication device. In an example, if the wireless communication device has been powered-on for the first time, the enabled SIM profile for each eUICC may be a provisioning profile that is pre-configured to enable initial network access, as described. In another example, a eUICC may store multiple operational SIM profiles that are disabled, in addition to one enabled operational SIM profile. In block 404, the wireless communication device processor may detect a condition for use of a new SIM profile to communicate on a modem stack associated with a eSIM. For example, a new SIM profile may be used to replace the provisioning profile, to communicate in a network different from that of the enabled operational SIM profile, etc.

In determination block 406, the wireless communication device processor may determine whether a suitable new SIM is already available on the wireless communication device. As described, each eUICC may be capable of storing additional operational SIM profiles in a disabled state, which may be switched out with the enabled SIM profile. In some examples, the suitable new SIM may be identified using any of a number of SIM selection parameters and/or routines. For example, in some examples the new SIM may be driven by user selection of a communication network, of a type of communication service, of a particular pricing parameter, etc. In some examples, the network of the enabled SIM profile may automatically select an appropriate network for service if the device has moved to a new location, which may result in automatic selection of a corresponding new SIM profile.

In response to determining that the suitable new SIM is not available on the wireless communication device (i.e., determination block 406="No"), the wireless communication device processor may send to a remote server (e.g., a subscription manager associated with a mobile network operator) a request to obtain a new SIM profile in block 408. In some examples, the request may include instructions relating to the SIM selection parameters, while in other examples such information is already copied to or accessible from the remote server. In block 410, the wireless communication device processor may download and install the new SIM profile provided by remote server. For example, the new SIM profile may be stored in the eUICC being provisioned.

Following operations in block 410, or in response to determining that a suitable new SIM is available on the wireless communication device (i.e., determination block 406="Yes"), the wireless communication device processor may perform an internal switch of the enabled SIM profile to the new SIM profile in block 412. That is, the new SIM profile may become the enabled SIM profile on the eUICC that is being provisioned.

The provisioning of the new SIM profile may trigger automatic customization of the wireless communication device. Specifically, in block 414, the wireless communication device processor may identify one or more parameter based on information from the eSIM and/or based on device features. Such parameters based on eSIM information may include, for example, network parameters (e.g., country code, network code, group identifier (group ID)), activated service information, user preferences built into the new SIM profile, etc. Parameters based on the device features may include, for example, specific components/chipset models, operating system information, RF resource capabilities, etc.

In block 416, the wireless communication device processor may select a configuration package based on the identified parameter(s). As described, the configuration package may include various configuration settings that customize attributes of the wireless communication device.

In determination block 418, the wireless communication device processor may determine whether the selected configuration package is available (i.e., stored) on the wireless communication device.

In response to determining that the selected configuration package is not available on the wireless communication device (e.g., determination block 418="No"), the wireless communication device processor may send a request for the selected configuration package to a network entity in block 420. In some examples, the network entity may be integrated with the remote server used for eSIM provisioning (e.g., subscription manager).

In block 422, the wireless communication device processor may receive the configuration package from the network entity.

In block 424, the wireless communication device processor may install the configuration settings in the received configuration package. For example, such configuration settings may include at least a set of modem configurations and commands for their activation. In another example, such configuration settings may include at least a set of application software settings.

In block 426, the wireless communication device processor may activate the installed configuration settings. In some examples, activation commands corresponding to the configuration settings may be included in the configuration package, and may be utilized by the wireless communication device processor.

In response to determining that the selected configuration package is available on the wireless communication device (i.e., determination block 418="Yes"), the wireless communication device processor may determine whether the configuration settings of the selected configuration package have been installed in determination block 428.

In response to determining that the configuration settings of the selected configuration package have not already been installed (i.e., determination block 428="No"), the wireless communication device processor may install the configuration settings in the received configuration package installed in block 424.

In response to determining that the configuration settings of the selected configuration package have already been installed (i.e., determination block 428="Yes"), the wireless communication device processor may activate the installed configuration settings in block 426. As a result, device components and/or functions of the wireless communication device are modified according to instructions of the configuration settings in the package.

While described with respect to a customization manager on the wireless communication device, in some examples a customization manager may be implemented on a server on which configuration packages are stored or accessible. That is, some or all of the operations in blocks 412 through 426 may be performed by the network entity.

In this manner, device customization may be implemented as a bootstrapping extension of the eSIM remote provisioning. The bootstrapping extension may enable provisioning of an eSIM on the wireless commutation device and, as part of the same process, configuring attributes of the wireless communication device. In various examples, the process may include a series of transactions, but appear to be a single step from the user point of view.

In examples in which a customization manager is implemented on the network entity, correlations between SIM profiles and configuration settings/packages may be stored in advance, such as by using a hierarchical file structure. In such examples, the boot-strapping extension may increase the size of the data blocks in the current eSIM remote provisioning protocol, thereby decreasing the number of transactions in the process.

Figure 4C:
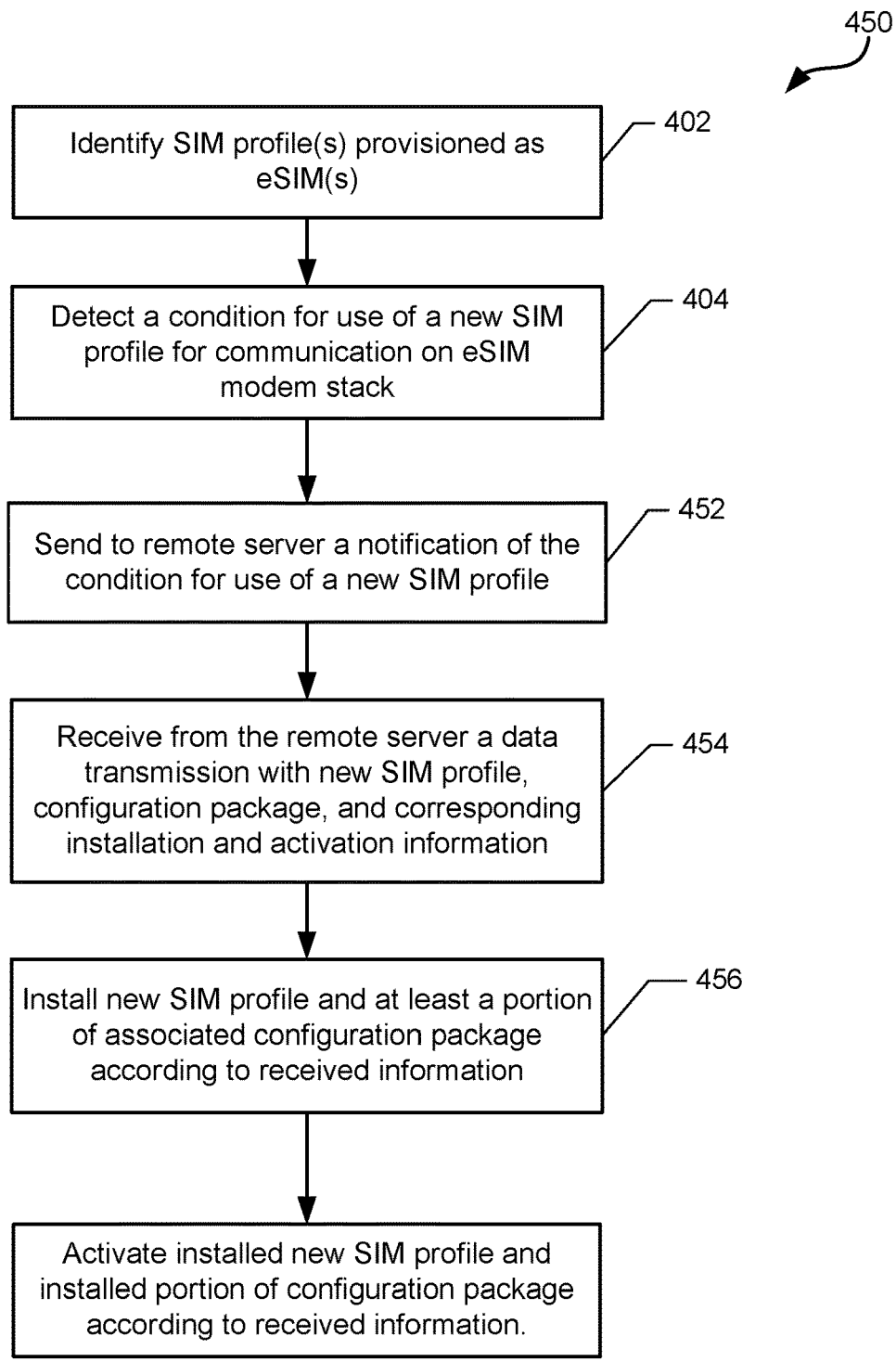

FIG. 4C illustrates a method 450 for customizing configuration settings on a wireless communication device using eSIM remote provisioning that is pushed by a remote network server. With reference to FIGS. 1A-4C, the wireless communication device (e.g., 102, 300) may be configured with at least one eSIM (e.g., 202a) supported by an RF resource (e.g., 218).

Although described below with reference to an eSIM implemented as a SIM profile in a eUICC, the method 450 may be applied to a variety of other device configurations, for example, multi-SIM devices configured with more than two eSIMs and/or with at least one SIM stored on a removable UICC. In various examples, a removable UICC may store a conventional SIM, or may store software that enables remote provisioning, thereby effectively retrofitting the removable SIM with eSIM capabilities.

As described with respect to method 400 (FIG. 4A), in method 450 the wireless communication device processor may identify SIM profiles that are provisioned as eSIM(s) on the wireless communication device in block 402, and detect a condition for use of a new SIM profile to communicate on a modem stack associated with a eSIM in block 404.

In block 452, the wireless communication device processor may send to a remote server (e.g., a server controlled by a mobile network operator) a notification of the condition for using a new SIM profile. In various examples, the remote server may host SIM profiles, device configuration packages associated with the SIM profiles, and installation and activation information corresponding to the SIM profiles and configuration packages. Optionally, the wireless communication device process may determine whether a suitable new SIM is already available on the wireless communication device prior to sending the notification to the remote server (not shown). In some examples, the notification sent to the remote server may include instructions relating to SIM selection parameters, while in other examples such information is already copied to or accessible from the remote server. Upon receiving the notification, a suitable new SIM profile may be automatically selected by the remote server, as well as an associated configuration package. As described, the configuration package may include various configuration settings that customize attributes of the wireless communication device. In some examples, various SIM profiles may be linked with one or multiple configuration packages in the network server. In some examples, the selection of the new SIM profile may trigger an automatic selection of an associated configuration package. For example, if the new SIM profile is linked with multiple configuration packages, automatic selection may involve dynamically evaluating parameters that are stored for the device, and evaluating properties of the selected new SIM profile.

In various examples, the remote server may push the selected new SIM profile and associated configuration package to the wireless device, along with corresponding installation and activation information. Such SIM profile, configuration package, and installation and activation information may be pushed in the same transaction, thereby providing a single-step provisioning process. In In block 454, the wireless communication device processor may automatically receive, from the remote server, a data transmission that includes a new SIM profile, a configuration package, and installation and activation information corresponding to the new SIM profile and configuration package. In block 456, the wireless communication device may install the new SIM profile and at least a portion of the associated configuration package according to the received information. As described, the received configuration package may include modem configurations, application software settings, etc.

In block 458, the wireless communication device processor may activate the installed new SIM and installed portion of the configuration package according to the received information.

For example, such configuration settings may include at least a set of modem configurations and commands for their activation. In another example, such configuration settings may include at least a set of application software settings.

Figure 5:
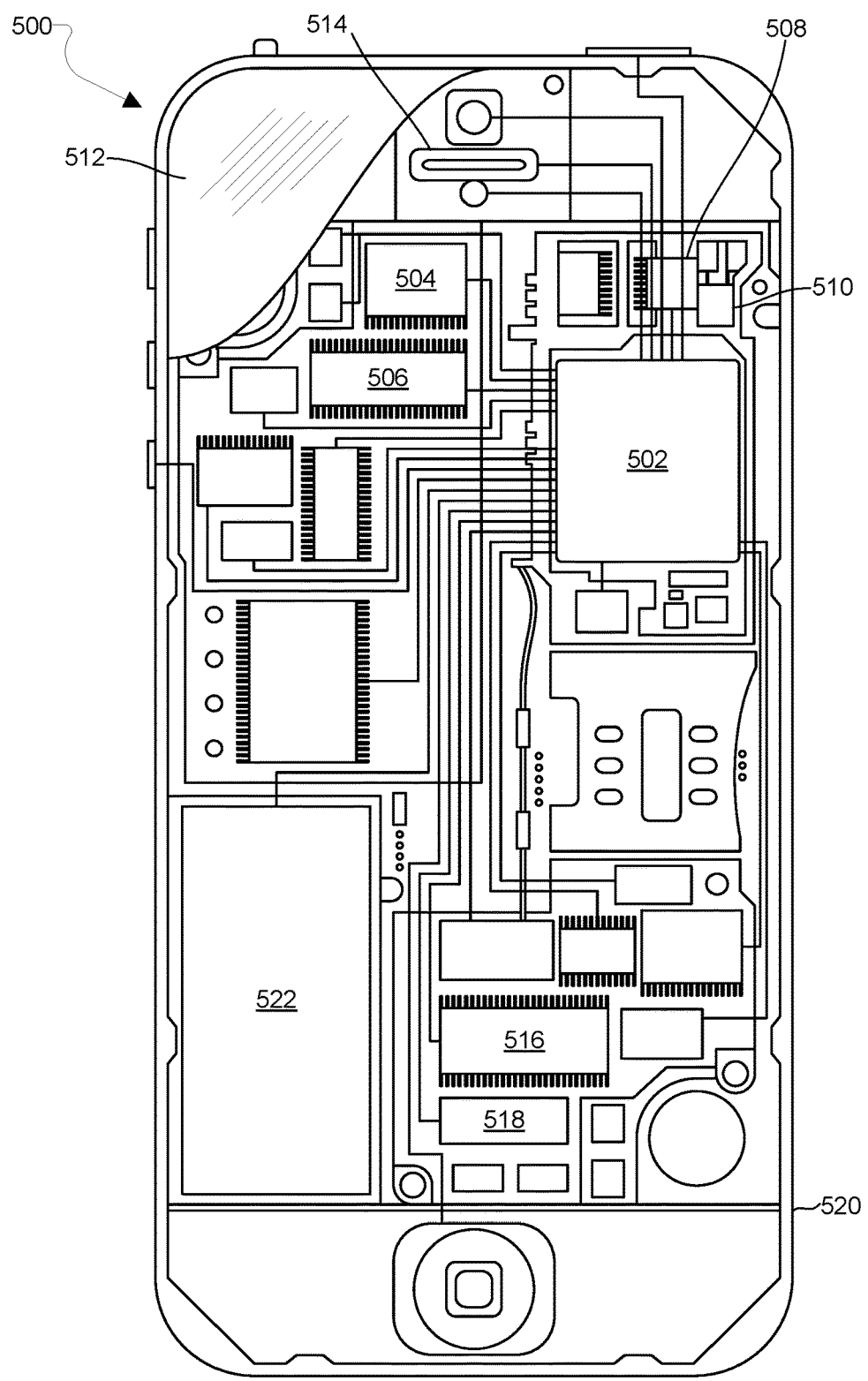
FIG. 5 is a component diagram of a wireless communication device suitable for use with various examples.

Various examples may be implemented in any of a variety of wireless communication devices, an example of which is illustrated in FIG. 5. For example, with reference to FIGS. 1-5, a wireless device 500 (which may correspond, for example, the wireless devices 102, 200 in FIGS. 1A-2) may include a processor 502 coupled to a touchscreen controller 504 and an internal memory 506. The processor 502 may be one or more multicore integrated circuits (ICs) designated for general or specific processing tasks. The internal memory 506 may be volatile or non-volatile memory, and may also be secure and/or encrypted memory, or unsecure and/or unencrypted memory, or any combination thereof.

The touchscreen controller 504 and the processor 502 may also be coupled to a touchscreen panel 512, such as a resistive-sensing touchscreen, capacitive-sensing touchscreen, infrared sensing touchscreen, etc. The wireless device 500 may have one or more radio signal transceivers 508 (e.g., Peanut®, Bluetooth®, Zigbee®, Wi-Fi, RF radio) and antennae 510, for sending and receiving, coupled to each other and/or to the processor 502. The transceivers 508 and antennae 510 may be used with the above-mentioned circuitry to implement the various wireless transmission protocol stacks and interfaces. The wireless device 500 may include a cellular network wireless modem chip 516 that enables communication via a cellular network and is coupled to the processor. The wireless device 500 may include a peripheral device connection interface 518 coupled to the processor 502. The peripheral device connection interface 518 may be singularly configured to accept one type of connection, or multiply configured to accept various types of physical and communication connections, common or proprietary, such as USB, FireWire, Thunderbolt, or PCIe. The peripheral device connection interface 518 may also be coupled to a similarly configured peripheral device connection port (not shown). The wireless device 500 may also include speakers 514 for providing audio outputs. The wireless device 500 may also include a housing 520, constructed of a plastic, metal, or a combination of materials, for containing all or some of the components discussed herein. The wireless device 500 may include a power source 522 coupled to the processor 502, such as a disposable or rechargeable battery. The rechargeable battery may also be coupled to the peripheral device connection port to receive a charging current from a source external to the wireless device 500.

Figure 6:
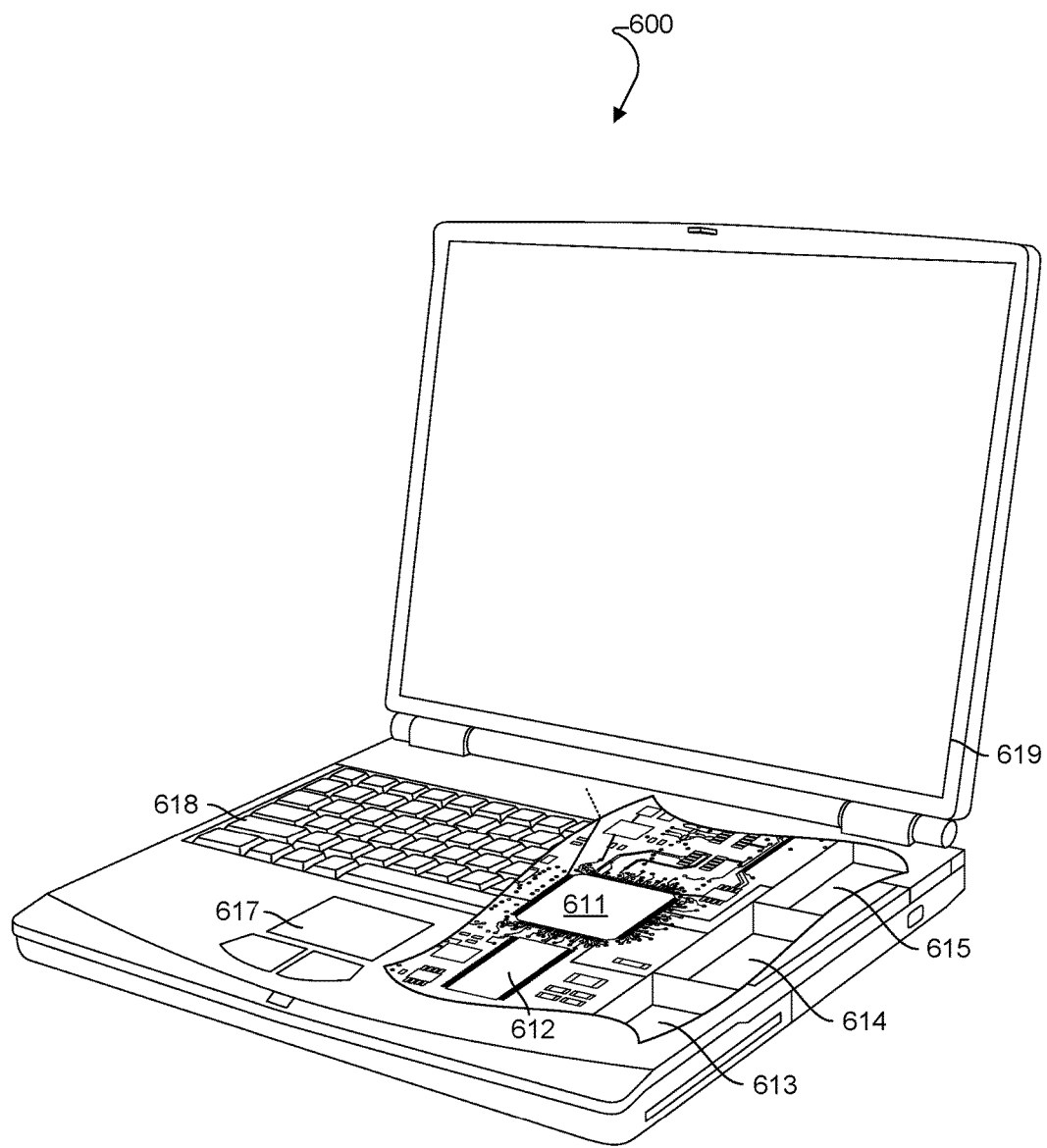
FIG. 6 is a component diagram of another wireless communication device suitable for use with various examples.

Various examples described above may also be implemented within a variety of personal computing devices, such as a laptop computer 600 (which may correspond, for example, the wireless devices 102, 200 in FIGS. 1A-2) as illustrated in FIG. 6. With reference to FIGS. 1-6, many laptop computers include a touchpad touch surface 617 that serves as the computer's pointing device, and thus may receive drag, scroll, and flick gestures similar to those implemented on wireless computing devices equipped with a touch screen display and described above. The laptop computer 600 will typically include a processor 611 coupled to volatile memory 612 and a large capacity nonvolatile memory, such as a disk drive 613 of Flash memory. The laptop computer 600 may also include a floppy disc drive 614 and a compact disc (CD) drive 615 coupled to the processor 611. The laptop computer 600 may also include a number of connector ports coupled to the processor 611 for establishing data connections or receiving external memory devices, such as a USB or FireWire® connector sockets, or other network connection circuits for coupling the processor 611 to a network. In a notebook configuration, the computer housing includes the touchpad touch surface 617, the keyboard 618, and the display 619 all coupled to the processor 611. Other configurations of the computing device may include a computer mouse or trackball coupled to the processor (e.g., via a USB input) as are well known, which may also be used in conjunction with various examples.

The processors 502 and 611 may be any programmable microprocessor, microcomputer or multiple processor chip or chips that can be configured by software instructions (applications) to perform a variety of functions, including the functions of various examples described above. In some devices, multiple processors may be provided, such as one processor dedicated to wireless communication functions and one processor dedicated to running other applications. Typically, software applications may be stored in the internal memory 506, 612 and 613 before they are accessed and loaded into the processors 502 and 611. The processors 502 and 611 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 502, 611, including internal memory or removable memory plugged into the device and memory within the processor 502 and 611, themselves.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit the various examples to a particular order, sequence, type of network or carrier.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary example, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed examples is provided to enable any person skilled in the art to make or use the claims. Various modifications to these examples will be readily apparent to those skilled in the art, and the generic principles defined herein may be applied to other examples without departing from scope of the claims. Thus, the claims are not intended to be limited to the examples shown herein but are to be accorded the widest scope consistent with the following claims and the principles and novel features disclosed herein.

What is claimed is:

1. A method for customizing a wireless communication device having at least one radio frequency (RF) resource associated with an embedded subscriber identity module (eSIM), the method comprising:
    detecting a condition that uses provisioning of a new subscriber identity module (SIM) profile for the eSIM;
    switching an enabled SIM profile for the new SIM profile;
    identifying a plurality of parameters based on information from the eSIM, wherein the plurality of parameters indicate at least one of a predefined region, a selected service provider, or a particular communication service associated with the new SIM profile;
    selecting a configuration package based on the identified plurality of parameters, wherein the configuration package provides configuration settings and software associated with at least one device feature and corresponding activation commands; and
    installing and activating the configuration settings and software associated with the at least one device feature.

2. The method of claim 1, further comprising:
    determining whether the new SIM profile is available on the wireless communication device;
    sending a request to obtain the new SIM profile from a remote server managed by a network operator; and
    downloading and installing the new SIM profile received from the remote server.

3. The method of claim 1, wherein:
    switching the enabled SIM profile for the new SIM profile comprises automatically receiving and installing the new SIM profile from a network server in response to the condition; and
    identifying the plurality of parameters and selecting the configuration package are performed by the network server, wherein the configuration package is automatically received from the network server together with the new SIM profile.

4. The method of claim 3, wherein the new SIM profile received from the network server includes corresponding installation and activation information.

5. The method of claim 1, wherein the plurality of parameters include at least one of a country code, a network code, a group identifier, a radio access technology capacity, or an activated service.

6. The method of claim 1, wherein identifying the plurality of parameters is further based on the at least one device feature, wherein the at least one device feature comprises a hardware or firmware element provided on the wireless communication device.

7. The method of claim 6, wherein the plurality of parameters include at least one of a chipset model, operating system information, or a radio access technology capability.

8. The method of claim 1, further comprising:
    determining whether the selected configuration package is available on the wireless communication device;
    sending a request for the selected configuration package to a network entity in response to determining that the selected configuration package is not available on the wireless communication device; and
    determining whether the configuration settings of the selected configuration package are installed in response to determining that the selected configuration package is available on the wireless communication device.

9. The method of claim 8, wherein the network entity comprises a remote server managed by a network operator.

10. The method of claim 9, wherein the remote server is a Subscription Manager configured according to Remote SIM Provisioning (RSP) Architecture standards.

11. The method of claim 1, wherein the selected configuration package includes at least one of hardware configurations and application settings.

12. A wireless communication device, comprising:
    a memory;
    at least one radio frequency (RF) resource coupled to the memory; and
    a processor coupled to the memory, the RF resource, and to at least one embedded subscriber identity module (eSIM), and configured to:
        detect a condition that uses provisioning of a new subscriber identity module (SIM) profile for the eSIM;
        switch an enabled SIM profile for the new SIM profile;
        identify a plurality of parameters based on information from the eSIM, wherein the plurality of parameters indicate at least one of a predefined region, a selected service provider or a particular communication service associated with the new SIM profile;
        select a configuration package based on the identified plurality of parameters, wherein the configuration package provides configuration settings and software associated with at least one device feature and corresponding activation commands; and
        install and activate the configuration settings and software associated with the at least one device feature.

13. The wireless communication device of claim 12, wherein the processor is further configured to:
    determine whether the new SIM profile is available on the wireless communication device;
    send a request to obtain the new SIM profile from a remote server managed by a network operator; and
    download and install the new SIM profile received from the remote server.

14. The wireless communication device of claim 12, wherein the processor is further configured to:

switch the enabled SIM profile for the new SIM profile by automatically receiving and installing the new SIM profile from a network server in response to the condition.

15. The wireless communication device of claim 14, wherein the new SIM profile received from the network server includes corresponding installation and activation instructions.

16. The wireless communication device of claim 12, wherein the plurality of parameters include at least one of a country code, a network code, a group identifier, a radio access technology capacity, or an activated service.

17. The wireless communication device of claim 12, wherein the plurality of parameters are further based on the at least one device feature, wherein the at least one device feature comprises a hardware or firmware element provided on the wireless communication device.

18. The wireless communication device of claim 17, wherein the plurality of parameters include at least one of a chipset model, operating system information, or a radio access technology capability.

19. The wireless communication device of claim 12, wherein the processor is further configured to:
determine whether the selected configuration package is available on the wireless communication device;
send a request for the selected configuration package to a network entity in response to determining that the selected configuration package is not available on the wireless communication device; and
determine whether the configuration settings of the selected configuration package are installed in response to determining that the selected configuration package is available on the wireless communication device.

20. The wireless communication device of claim 19, wherein the network entity comprises a remote server managed by a network operator.

21. The wireless communication device of claim 20, wherein the remote server is a Subscription Manager configured according to Remote SIM Provisioning (RSP) Architecture standards.

22. The wireless communication device of claim 12, wherein the selected configuration package includes at least one of hardware configurations and application settings.

23. A wireless communication device, comprising:
a radio frequency (RF) resource associated with an embedded subscriber identity module (eSIM);
means for detecting a condition that uses provisioning of a new subscriber identity module (SIM) profile for the eSIM;
means for switching an enabled SIM profile for the new SIM profile;
means for identifying a plurality of parameters based on information from the eSIM, wherein the plurality of parameters indicate at least one of a predefined region, a selected service provider or a particular communication service associated with the new SIM profile;
means for selecting a configuration package based on the identified plurality of parameters, wherein the configuration package provides configuration settings and software associated with at least one device feature and corresponding activation commands; and
means for installing and activating the configuration settings and software associated with the at least one device feature.

24. A non-transitory processor-readable storage medium having stored thereon processor-executable instructions configured to cause a processor of a wireless communication device to perform operations comprising:
detecting a condition that uses provisioning of a new subscriber identity module (SIM) profile for an embedded SIM (eSIM) associated with a radio frequency (RF) resource;
switching an enabled SIM profile for the new SIM profile;
identifying a plurality of parameters based on information from the eSIM, wherein the plurality of parameters indicate at least one of a predefined region, a selected service provider or a particular communication service associated with the new SIM profile;
selecting a configuration package based on the identified plurality of parameters, wherein the configuration package provides configuration settings and software associated with at least one device feature and corresponding activation commands; and
installing and activating the configuration settings and software associated with the at least one device feature.

25. The non-transitory processor-readable storage medium of claim 24, wherein the stored processor-executable instructions are configured to cause the processor of the wireless communication device to perform operations further comprising:
determining whether the new SIM profile is available on the wireless communication device;
sending a request to obtain the new SIM profile from a remote server managed by a network operator; and
downloading and installing the new SIM profile received from the remote server.

26. The non-transitory processor-readable storage medium of claim 24, wherein the stored processor-executable instructions are configured to cause the processor of the wireless communication device to perform operations such that:
switching the enabled SIM profile for the new SIM profile comprises automatically receiving and installing the new SIM profile from a network server in response to the condition.

27. The non-transitory processor-readable storage medium of claim 26, wherein the new SIM profile received from the network server includes corresponding installation and activation instructions.

28. The non-transitory processor-readable storage medium of claim 24, wherein the plurality of parameters include at least one of a country code, a network code, a group identifier, a radio access technology capacity, or an activated service.

* * * * *